(12) United States Patent
Lee

(10) Patent No.: US 10,156,843 B2
(45) Date of Patent: Dec. 18, 2018

(54) APPARATUS AND METHOD FOR DETECTING MALFUNCTION OF TASK SCHEDULER IN BATTERY MANAGEMENT SYSTEM

(71) Applicant: LG CHEM, LTD., Seoul (KR)

(72) Inventor: Hyunchul Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 93 days.

(21) Appl. No.: 15/110,185

(22) PCT Filed: Oct. 23, 2015

(86) PCT No.: PCT/KR2015/011280
§ 371 (c)(1),
(2) Date: Jul. 7, 2016

(87) PCT Pub. No.: WO2016/064244
PCT Pub. Date: Apr. 28, 2016

(65) Prior Publication Data
US 2016/0327943 A1    Nov. 10, 2016

(30) Foreign Application Priority Data

Oct. 24, 2014   (KR) .................. 10-2014-0144678

(51) Int. Cl.
G05B 23/02     (2006.01)
H02J 7/00      (2006.01)

(52) U.S. Cl.
CPC ............ G05B 23/0208 (2013.01); H02J 7/00 (2013.01); H02J 7/007 (2013.01); H02J 7/0021 (2013.01);
(Continued)

(58) Field of Classification Search
CPC ...... G05B 23/0208; H02J 7/00; H02J 7/0021; H02J 7/0029; H02J 7/007; G06F 11/079; G06F 1/04
See application file for complete search history.

(56) References Cited

U.S. PATENT DOCUMENTS 4,851,985 A     7/1989   Burror et al.
2004/0066171 A1  4/2004   Mori
(Continued)

FOREIGN PATENT DOCUMENTS

CN    103917884 A    7/2014
JP    2004-094607 A  3/2004
(Continued)

OTHER PUBLICATIONS

International Search Report (PCT/ISA/210) issued in PCT/KR2015/011280, dated Feb. 12, 2016.
(Continued)

Primary Examiner — Kyle R Quigley
(74) Attorney, Agent, or Firm — Birch, Stewart, Kolasch & Birch, LLP

(57) ABSTRACT

Disclosed is a technology for detecting an erroneous operation of a task scheduler of a battery management system. An apparatus for detecting an erroneous operation according to an exemplary embodiment includes: a first scheduler module configured to control a first task to be executed for every first period; a second scheduler module configured to control a second task to be executed for every second period; a task counting unit configured to increase the first counting value for the first scheduler module in accordance with the first period whenever the first task is executed, and increase the second counting value for the second scheduler module in accordance with the second period whenever the second task is executed; and an erroneous operation detecting unit configured to detect erroneous operations of the first sched-
(Continued)

uler module and the second scheduler module based on the first counting value and the second counting value.

8 Claims, 3 Drawing Sheets

(52) U.S. Cl.
CPC ......... H02J 7/0029 (2013.01); *Y02T 10/7055* (2013.01)

(56) References Cited

U.S. PATENT DOCUMENTS

| | | | | |
|---|---|---|---|---|
| 2004/0146130 A1* | 7/2004 | Noh | ..................... | H03K 5/19 |
| | | | | 375/354 |
| 2010/0238917 A1* | 9/2010 | Silverman | ............. | H04J 3/0667 |
| | | | | 370/350 |
| 2012/0324578 A1 | 12/2012 | Seinfeld et al. | | |
| 2014/0312915 A1* | 10/2014 | Mukaitani | .......... | G01R 31/3624 |
| | | | | 324/434 |

FOREIGN PATENT DOCUMENTS

| | | |
|---|---|---|
| JP | 2014-055896 A | 3/2014 |
| KR | 2003-0008501 A | 1/2003 |
| KR | 10-2014-0073959 A | 6/2014 |
| WO | WO 03/034568 A1 | 4/2003 |

OTHER PUBLICATIONS

European Search Report for Appl. No. 15852486.8 dated Jul. 20, 2017.

* cited by examiner

[Figure 1]
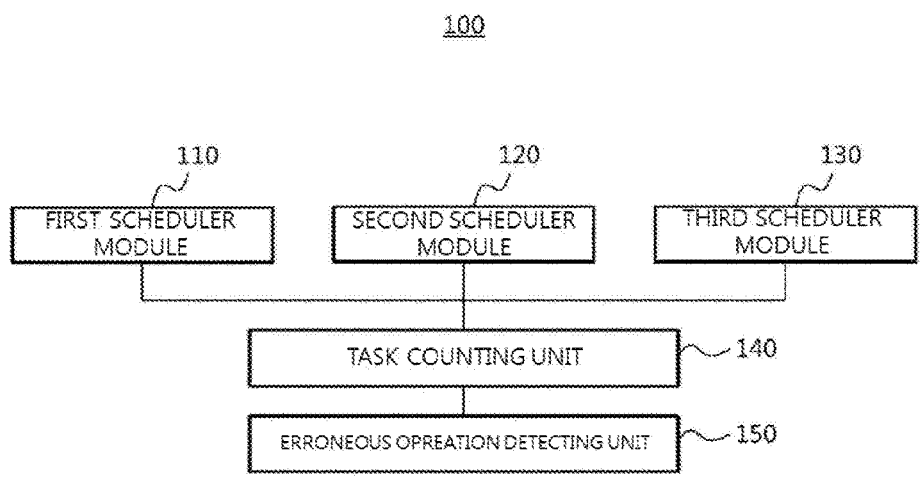
[Figure 2]
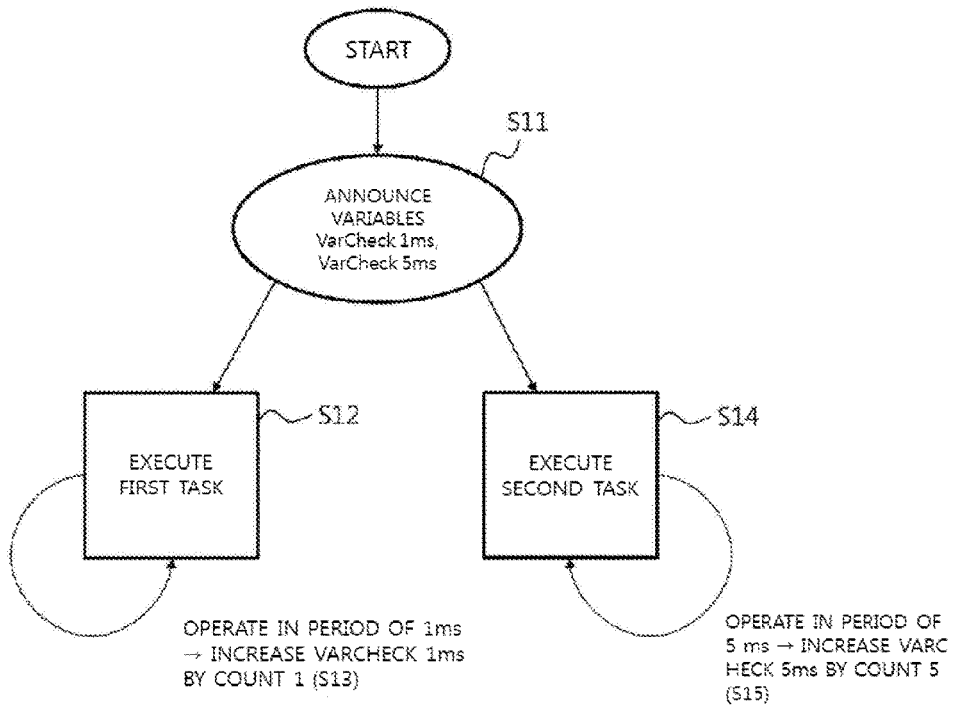

[Figure 3]
[Figure 4]
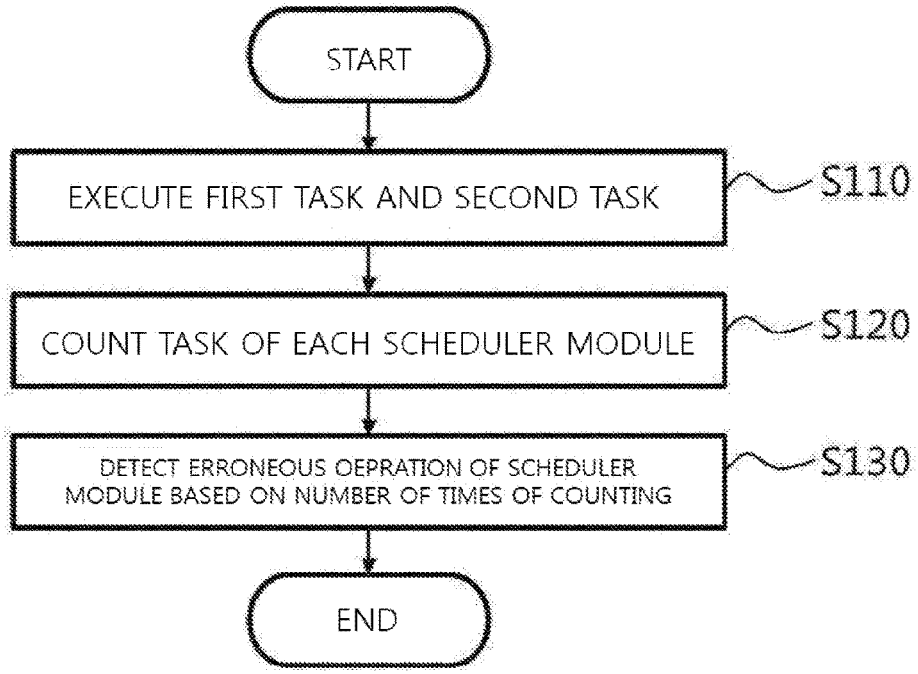

[Figure 5]
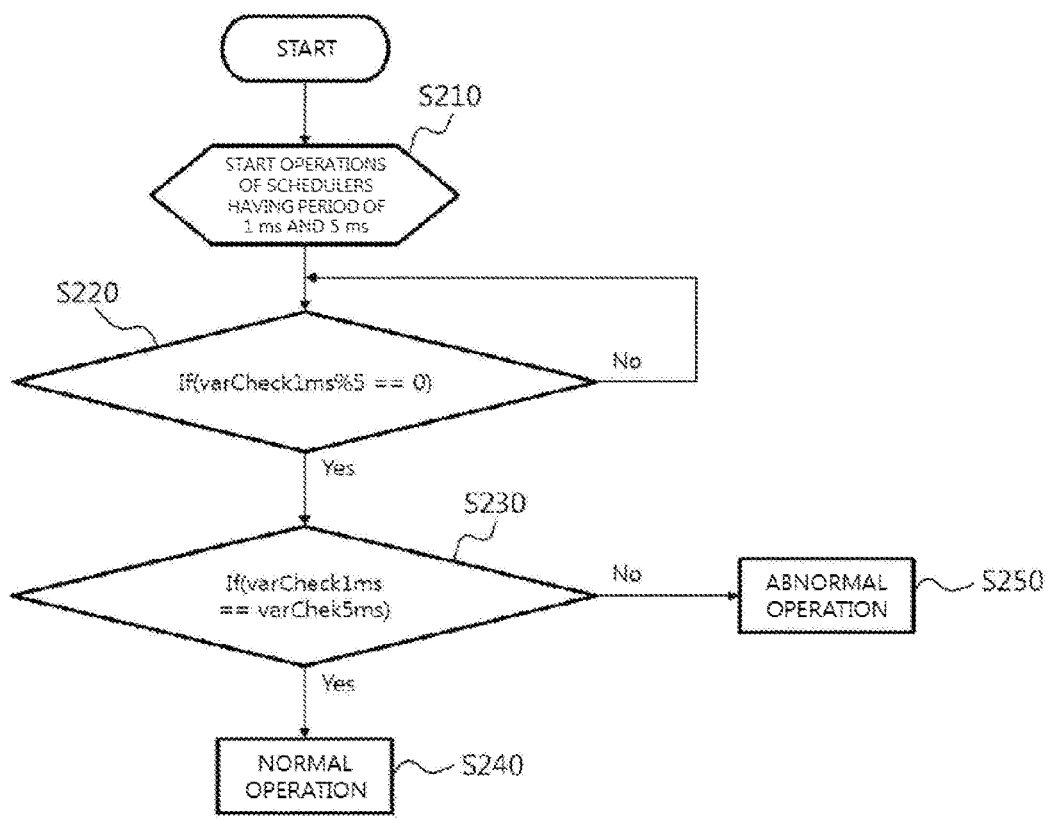

APPARATUS AND METHOD FOR DETECTING MALFUNCTION OF TASK SCHEDULER IN BATTERY MANAGEMENT SYSTEM

TECHNICAL FIELD

This application claims priority to and the benefit of Korean Patent Application No. 10-2014-0144678 filed in the Korean Intellectual Property Office on Oct. 24, 2014, the entire contents of which are incorporated herein by reference.

The present invention relates to an apparatus and a method for detecting an erroneous operation of a task scheduler of a battery management system, and more particularly, to an apparatus and a method for detecting an erroneous operation of a task scheduler of a battery management system, which are capable of easily detecting an erroneous operation of a scheduler during an operation, thereby improving stability of a battery management system.

BACKGROUND ART

A secondary battery, which has high application easiness according to a product group and an electric characteristic, such as a high energy density, has been universally applied to an electric vehicle (EV), a hybrid electric vehicle (HEV), or an energy storage system (ESS) driven by an electric driving source, as well as a portable device. The secondary battery attracts attention as a new energy source that is environmentally-friendly and has improved energy efficiency in that it is possible to innovatively decrease use of fossil fuel, which is the primary advantage, while not generating a by-product when using energy.

The secondary battery includes positive electrode and negative electrode current collectors, a separator, an active material, an electrolyte, and the like and is repeatedly chargeable/dischargeable by an electro-chemical reaction between constituent elements. For example, a widely used lithium polymer secondary battery has an operation voltage of about 3.7 V to 4.2 V. Accordingly, in order to obtain a high output battery pack applied to the EV and the like, the battery pack is configured by connecting a plurality of unit secondary battery cells in series.

In addition to the basic structure, the battery pack additionally includes a battery management system (BMS), to which an algorithm for a power supply control for a driving load of a motor and the like, a measurement of an electric characteristic value, such as a current or a voltage, a charging/discharging control, a voltage equalization control, an estimation of a state of charge (SOC), and the like is applied to monitor and control a state of the secondary battery.

As the number of functions of the BMS is increased, several scheduling is operated by software. The schedulers (tasks and timers) slightly influence operations due to a priority of the corresponding scheduling, and when an excessive load is applied to one scheduler, the scheduling breaks down. Particularly, the related art does not have a function of checking the corresponding scheduler during an operation after the scheduler is initially set, so that there is a problem in stability.

DETAILED DESCRIPTION OF THE INVENTION

Technical Problem

An object of the present invention is to implement a battery management system having high stability.

Another object of the present invention is to easily detect an erroneous operation of a scheduler of a battery management system.

An object of the present invention is to accurately recognize an erroneously operated scheduler when a plurality of schedulers is operated.

Technical Solution

In order to achieve the objects, an apparatus for detecting an erroneous operation of a task scheduler of a battery management system according to the present invention includes: a first scheduler module configured to control a first task to be executed for every first period; a second scheduler module configured to control a second task to be executed for every second period; a task counting unit configured to increase a first counting value for the first scheduler module in accordance with the first period whenever the first task is executed, and increase a second counting value for the second scheduler module in accordance with the second period whenever the second task is executed; and an erroneous operation detecting unit configured to detect erroneous operations of the first scheduler module and the second scheduler module based on the first counting value and the second counting value.

The erroneous operation detecting unit may detect the erroneous operations of the first scheduler module and the second scheduler module based on the first counting value and the second counting value checked every time of a common multiple of the first period and the second period.

The task counting unit may increase the first counting value by the first period whenever the first task is executed, and increase the second counting value by the second period whenever the second task is executed.

The erroneous operation detecting unit may determine that the erroneous operation is generated when the first counting value is different from the second counting value at the time of the common multiple of the first period and the second period.

The apparatus may further include a third scheduler module configured to control a third task to be executed for every third period, in which the task counting unit may increase a third counting value for the third scheduler module in accordance with the third period whenever the third task is executed, and the erroneous operation detecting unit may detect the erroneous operations of the first scheduler module, the second scheduler module, and the third scheduler module based on the first counting value, the second counting value, and the third counting value.

The erroneous operation detecting unit may detect the erroneous operations of the first scheduler module, the second scheduler module, and the third scheduler module based on the first counting value, the second counting value, and the third counting value at every first common multiple time of the first period and the second period and every second common multiple time of the first period and the third period.

When the first counting value is the same as the second counting value at the first common multiple time and the first counting value is different from the third counting value at the second common multiple time, the erroneous operation detecting unit may determine that the erroneous operation is generated in the third scheduler module.

When the first counting value is different from the second counting value at the first common multiple time and the first counting value is the same as the third counting value at the second common multiple time, the erroneous operation detecting unit may determine that the erroneous operation is generated in the second scheduler module.

When the first counting value is different from the second counting value at the first common multiple time and the first counting value is different from the third counting value at the second common multiple time, the erroneous operation detecting unit may determine that the erroneous operation is generated in the first scheduler module.

Further, in order to achieve the objects, a method for detecting an erroneous operation of a task scheduler of a battery management system according to the present invention includes: controlling a first task to be executed for every first period; controlling a second task to be executed for every second period; increasing the first counting value for the first scheduler module in accordance with the first period whenever the first task is executed, and increasing the second counting value for the second scheduler module in accordance with the second period whenever the second task is executed; and detecting erroneous operations of the first scheduler module and the second scheduler module based on the first counting value and the second counting value.

The detecting of the erroneous operation may include detecting the erroneous operations of the first scheduler module and the second scheduler module based on the first counting value and the second counting value checked every time of a common multiple of the first period and the second period.

The increasing of the first counting value and the second counting value may include increasing the first counting value by the first period whenever the first task is executed, and increasing the second counting value by the second period whenever the second task is executed.

The detecting of the erroneous operation may include determining that the erroneous operation is generated when the first counting value is different from the second counting value at the time of the common multiple of the first period and the second period.

The detecting of the erroneous operation may include: determining whether the first scheduler module is operated at the time of the common multiple; comparing the first counting value with the second counting value when the first scheduler module is operated at the time of the common multiple; and determining that the erroneous operation is generated when the first counting value is different from the second counting value.

Advantageous Effects

According to exemplary embodiments of the present invention, it is possible to implement a battery management system having excellent stability.

Further, according to exemplary embodiments of the present invention, it is possible to easily detect an erroneous operation of a scheduler of a battery management system.

Further, according to exemplary embodiments of the present invention, it is possible to accurately recognize an erroneously operated scheduler when a plurality of schedulers is operated

BRIEF DESCRIPTION OF DRAWINGS

FIG. 1 is a block diagram illustrating a configuration of an apparatus for detecting an erroneous operation of a task scheduler of a battery management system according to an exemplary embodiment of the present invention.

FIG. 2 is a diagram for describing an operation of the apparatus for detecting the erroneous operation of the task scheduler of the battery management system according to the exemplary embodiment of the present invention in a case where a scheduler module having a period of 1 ms and a scheduler module having a period of 5 ms are included.

FIG. 3 is a diagram for describing an example, in which an operation state of a scheduler module is determined when three scheduler modules are included.

FIG. 4 is a flowchart for describing a method for detecting an erroneous operation of a task scheduler of a battery management system according to an exemplary embodiment of the present invention.

FIG. 5 is a diagram for describing the method for detecting the erroneous operation of the task scheduler of the battery management system according to the exemplary embodiment of the present invention in a case where two scheduler modules are included.

BEST MODE

The present invention will be described in detail below with reference to the accompanying drawings. Herein, the repeated description, the detailed description of a known function and configuration that may make the purpose of the present invention unnecessarily ambiguous in describing the spirit of the present invention will be omitted. Exemplary embodiments of the present invention are provided so that those skilled in the art may more completely understand the present invention. Accordingly, the shape, the size, etc., of elements in the figures may be exaggerated for explicit comprehension.

Hereinafter, a structure and an operation of an apparatus for detecting an erroneous operation of a task scheduler of a battery management system according to an exemplary embodiment of the present invention will be described.

FIG. 1 is a block diagram illustrating a configuration of an apparatus for detecting an erroneous operation of a task scheduler of a battery management system according to an exemplary embodiment of the present invention. FIG. 2 is a diagram for describing an operation of the apparatus for detecting the erroneous operation of the task scheduler of the battery management system according to the exemplary embodiment of the present invention in a case where a scheduler module having a period of 1 ms and a scheduler module having a period of 5 ms are included. FIG. 3 is a diagram for describing an example, in which an operation state of a scheduler module is determined when three scheduler modules are included.

Referring to FIG. 1, an apparatus 100 for detecting an erroneous operation of a task scheduler of a battery management system according to an exemplary embodiment of the present invention may include a first scheduler module 110, a second scheduler module 120, a third scheduler module 130, a task counting unit 140, and an erroneous operation detecting unit 150.

The first scheduler module 110 controls a first task to be executed for every first period. The second scheduler module 120 controls a second task to be executed for every second period. The third scheduler module 130 controls a third task to be executed for every third period. In this case, the first task, the second task, and the third task mean execution operations performed by different battery management systems. The first period, the second period, and the third period mean periods, in which the first task, the second task, and the third task are executed, respectively. Further, the first period, the second period, and the third period may be formed of periods of different times.

The task counting unit 140 increases the first counting value for the first scheduler module 110 in accordance with the first period whenever the first task is executed. Further, the task counting unit 140 increases the second counting value for the second scheduler module 120 in accordance with the second period whenever the second task is executed. Further, the task counting unit 140 increases the third counting value for the third scheduler module 130 in accordance with the third period whenever the third task is executed. In this case, the task counting unit 140 may increase the first counting value by the first period whenever the first task is executed, increase the second counting value by the second period whenever the second task is executed, and increase the third counting value by the third period whenever the third task is executed.

Referring to FIG. 2 together, there is illustrated an implementation example of the operation of increasing the counting value of each scheduler module in the apparatus 100 for detecting the erroneous operation of the task scheduler of the battery management system according to the exemplary embodiment of the present invention when the first scheduler module 110 controlling the first task to be executed in the period of 1 ms and the second scheduler module 120 controlling the second task to be executed in the period of 5 ms are included.

The first scheduler module 110 and the second scheduler module 120 control the first task and the second task to be executed at the same time, and then the first scheduler module 110 controls the first task to be executed in the period of 1 ms, and the second scheduler module 120 controls the second task to be executed in the period of 5 MS.

Further, the task counting unit 140 first announces the first number varCheck1 ms of times of counting and the second number varCheck5 ms of times of counting (S11), and increases the first number varCheck1 ms of times of counting by 1 (S13) so as to correspond to the period whenever the first task is executed by the first scheduler module 110 (S12). Further, the task counting unit 140 increases the second number varCheck5 ms of times of counting by 5 (S15) so as to correspond to the period whenever the second task is executed by the second scheduler module 120 (S14).

The erroneous operation detecting unit 150 may detect erroneous operations of the first scheduler module 110, the second scheduler module 120, and the third scheduler module 130 based on the first counting value, the second counting value, and the third counting value.

The erroneous operation detecting unit 150 may detect erroneous operations of the first scheduler module 110 and the second scheduler module 120 based on the first counting value and the second counting value checked every time of a common multiple of the first period and the second period. Further, the erroneous operation detecting unit 150 may determine that the erroneous operation of the first scheduler module 110 or the second scheduler module 120 is generated when the first counting value is different from the second counting value at a time of the common multiple of the first period and the second period.

Further, the erroneous operation detecting unit 150 may detect the erroneous operations of the first scheduler module 110, the second scheduler module 120, and the third scheduler module 130 based on the first counting value, the second counting value, and the third counting value at every first common multiple time of the first period and the second period and second common multiple time of the first period and the third period.

In this case, when the first counting value is the same as the second counting value at the first common multiple time and the first counting value is different from the third counting value at the second common multiple time, the erroneous operation detecting unit 150 may determine that the erroneous operation is generated in the third scheduler module 130.

Further, when the first counting value is different from the second counting value at the first common multiple time and the first counting value is the same as the third counting value at the second common multiple time, the erroneous operation detecting unit 150 may determine that the erroneous operation is generated in the second scheduler module 120.

Further, when the first counting value is different from the second counting value at the first common multiple time and the first counting value is different from the third counting value at the second common multiple time, the erroneous operation detecting unit 150 may determine that the erroneous operation is generated in the first scheduler module 110.

Referring to FIG. 3 together, there is illustrated an example, in which an operation state of each scheduler module is determined when the three scheduler modules are included. It is assumed that the first scheduler module 110 controls the first task to be executed in the period of 1 ms, the second scheduler module 120 controls the second task to be executed in the period of 5 ms, and the third scheduler module 130 controls the third task to be executed in the period of 10 ms. In this case, the erroneous operation detecting unit 150 may determine an erroneous operation (which is called "determination A") by comparing the numbers of times of counting between the first scheduler module 110 and the second scheduler module 120 in the period of 5 ms, and determine an erroneous operation (which is called "determination B") by comparing the numbers of times of counting between the first scheduler module 110 and the third scheduler module 130 in the period of 10 ms. Then, when both determination A and determination B are pass, the erroneous operation detecting unit 150 may determine that there is no error in all of the scheduler modules, when determination A is fail and determination B is pass, the erroneous operation detecting unit 150 may determine that there is an error in the second scheduler module 120, when determination A is pass and determination B is fail, the erroneous operation detecting unit 150 may determine that there is an error in the third scheduler module 130, and when determination A is fail and determination B is fail, the erroneous operation detecting unit 150 may determine that there is an error in the first scheduler module 110. In this case, pass means a case where the numbers of times of counting between the scheduler modules are the same at the determination time, and fail means a case where the numbers of times of counting between the scheduler modules are different from each other at the determination time.

Hereinafter, a method for detecting an erroneous operation of a task scheduler of a battery management system according to an exemplary embodiment of the present invention will be described.

FIG. 4 is a flowchart for describing a method for detecting an erroneous operation of a task scheduler of a battery management system according to an exemplary embodiment of the present invention.

Referring to FIG. 4, in the method for detecting the erroneous operation of the task scheduler of the battery management system according to the exemplary embodiment of the present invention, first, a first task is controlled to be executed for every first period and a second task is controlled to be executed for every second period (S110).

Further, the first counting value for a first scheduler module is increased in accordance with the first period whenever the first task is executed, and the second counting value for a second scheduler module is increased in accordance with the second period whenever the second task is executed (S120). In this case, in operation S120, the first counting value may be increased by the first period whenever the first task is executed, and the second counting value may be increased by the second period whenever the second task is executed.

After operation S120, erroneous operations of the first scheduler module and the second scheduler module are detected based on the first counting value and the second counting value (S130). In this case, in operation S130, the erroneous operations of the first scheduler module and the second scheduler module may be detected based on the first counting value and the second counting value checked every time of a common multiple of the first period and the second period. Further, in operation S130, when the first counting value is different from the second counting value at the time of the common multiple of the first period and the second period, it may be determined that the erroneous operation is generated.

Particularly, operation S130 may include an operation of determining whether the first scheduler module is operated at the time of the common multiple, an operation of comparing the first counting value with the second counting value when the first scheduler module is operated at the time of the common multiple, and an operation of determining that the erroneous operation is generated when the first counting value is different from the second counting value.

FIG. 5 is a diagram for describing the method for detecting the erroneous operation of the task scheduler of the battery management system according to the exemplary embodiment of the present invention in a case where two scheduler modules are included.

Referring to FIG. 5, a first scheduler module controlling a first task to be executed in a period of 1 ms and a second scheduler module controlling a second task to be executed in a period of 5 ms start operations at the same time (S210).

Then, it is determined whether the first task has been operated at a common multiple time (5 ms) of the execution control period of the first scheduler module and the second scheduler module (S220).

When the first task has been operated at the common multiple time (5 ms), it is determined whether the number varCheck1 ms of times of counting of the first scheduler module is the same as the number varCheck5 ms of times of counting of the second scheduler module at the corresponding time (S230). The counting value may be increased by 1 whenever the first task is executed in accordance with the period, and the counting value may be increased by 5 whenever the second task is executed in accordance with the period.

As a result of the determination of operation S230, when the number varCheck1 ms of times of counting of the first scheduler module is the same as the number varCheck5 ms of times of counting of the second scheduler module, it is determined that the first scheduler module and the second scheduler module are normally operated (S240). However, as the result of the determination of operation S230, when the number varCheck1 ms of times of counting of the first scheduler module is different from the number varCheck5 ms of times of counting of the second scheduler module, it is determined that the first scheduler module and the second scheduler module are abnormally operated, that is, erroneously operated (S250).

The method for detecting the erroneous operation of the task scheduler of the battery management system according to the exemplary embodiment of the present invention may be implemented as a program command which may be executed by various computers to be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include magnetic media such as a hard disk, a floppy disk, or a magnetic tape, optical media such as a CD-ROM or a DVD, magneto-optical media such as a floptical disk, and every type of hardware device which is specifically configured to store and execute the program command such as a ROM, a RAM, and a flash memory. In addition, examples of the program commands may include high class language codes, which can be executed in a computer by using an interpreter, as well as machine codes made by a compiler. The hardware device may be configured to be operated with one or more software modules in order to perform the operation of the present invention, and an opposite situation thereof is available.

The instructions of the principles of the present invention may be implemented by a combination of hardware and software. Further, the software may be implemented by an application program actually implemented on a program storage unit. The application program may be uploaded to a machine including a predetermined appropriate architecture and be executed by the machine. Preferably, the machine may be implemented on a computer platform having hardware, such as one or more central processing units (CPUs), computer processors, random access memories (RAMs), and input/output (I/O) interfaces. Further, the computer platform may include an operation system and a micro command code. The various processes and functions described herein may be a part of a micro command code, a part of an application program, or any combination of the micro command code and the application program, and may be executed by various processing apparatuses including a CPU. Additionally, other various peripheral devices, such as an additional data storage unit and printer, may be connected to the computer platform.

Some of the constituent system components and the methods illustrated in the accompanying drawings are preferably implemented by software, so that it shall be additionally appreciated that the actual connections between the system components or the process function blocks may be varied according to a programming method of the principles of the present invention. When the aforementioned instructions are given, those skilled in the art may consider the implementation examples or configurations of the principles of the present invention.

In the apparatus and the method for detecting the erroneous operation of the task scheduler of the battery management system according to the exemplary embodiment of the present invention, the configuration and method of embodiments as described above may not be applied with limitation, but the embodiments may be configured by selectively combining all or a part of each embodiment such that various modifications may be made.

The invention claimed is:

1. A battery management system for monitoring and controlling a state of a secondary battery including an apparatus for detecting an erroneous operation of a task scheduler of the battery management system, the battery management system comprising:
a processor configured to:
control a first task of the battery management system to be executed for every first period;
control a second task of the battery management system to be executed for every second period, different than the first period, wherein the second period is a multiple of the first period;
increase a first counting value equal to the first period whenever the first task is executed, and increase a second counting value equal to the second period whenever the second task is executed; and
detect erroneous operations of the first task and the second task at every common multiple of the first and second periods based on the first counting value and the second counting value, respectively,
wherein the first and second tasks are different from one another and they are one of a power supply control for driving a motor, a measurement of an electrical characteristic value of the secondary battery, charging/discharging control of the secondary battery, a voltage equalization control of the secondary battery, and estimation of a state of charge of the secondary battery.

2. The apparatus of claim 1, wherein the processor is further configured to control a third task to be executed for every third period, wherein the third period is a multiple of the first and second periods,
wherein the processor unit increases a third counting value f in accordance with the third period whenever the third task is executed, and
wherein the processor detects the erroneous operations of the first task, the second task, and the third task based on the first counting value, the second counting value, and the third counting value, respectively.

3. The apparatus of claim 2, wherein the processor detects the erroneous operations of the first task, the second task, and the third task based on the first counting value, the second counting value, and the third counting value, respectively at every first common multiple time of the first period and the second period and every second common multiple time of the first period and the third period.

4. The apparatus of claim 3, wherein when the first counting value is the same as the second counting value at the first common multiple time and the first counting value is different from the third counting value at the second common multiple time, the processor determines that the erroneous operation is generated in the third task.

5. The apparatus of claim 3, wherein when the first counting value is different from the second counting value at the first common multiple time and the first counting value is the same as the third counting value at the second common multiple time, the processor determines that the erroneous operation is generated in the second task.

6. The apparatus of claim 3, wherein when the first counting value is different from the second counting value at the first common multiple time and the first counting value is different from the third counting value at the second common multiple time, the processor determines that the erroneous operation is generated in the first task.

7. A method for detecting an erroneous operation of a task scheduler of a battery management system for monitoring and controlling a state of a secondary battery, the method comprising:
controlling a first task of the battery management system to be executed for every first period;
controlling a second task of the battery management system to be executed for every second period, different than the first period, wherein the second period is a multiple of the first period;
increasing a first counting value for the first task equal to the first period whenever the first task is executed, and increasing a second counting value for the second task equal to the second period whenever the second task is executed; and
detecting erroneous operations of the first task and the second task at every common multiple of the first and second periods based on the first counting value and the second counting value;
wherein the first and second tasks are different from one another and they are one of a power supply control for driving a motor, a measurement of an electrical characteristic value of the secondary battery, charging/discharging control of the secondary battery, a voltage equalization control of the secondary battery, and estimation of a state of charge of the secondary battery.

8. The method of claim 7, wherein the detecting of the erroneous operation includes:
determining whether the first task is operated at the time of the common multiple;
comparing the first counting value with the second counting value when the first task is operated at the time of the common multiple; and
determining that the erroneous operation is generated when the first counting value is different from the second counting value.

* * * * *